Jan. 17, 1956 — P. SCHELL — 2,731,230
VALVE STRUCTURE
Filed Jan. 12, 1952
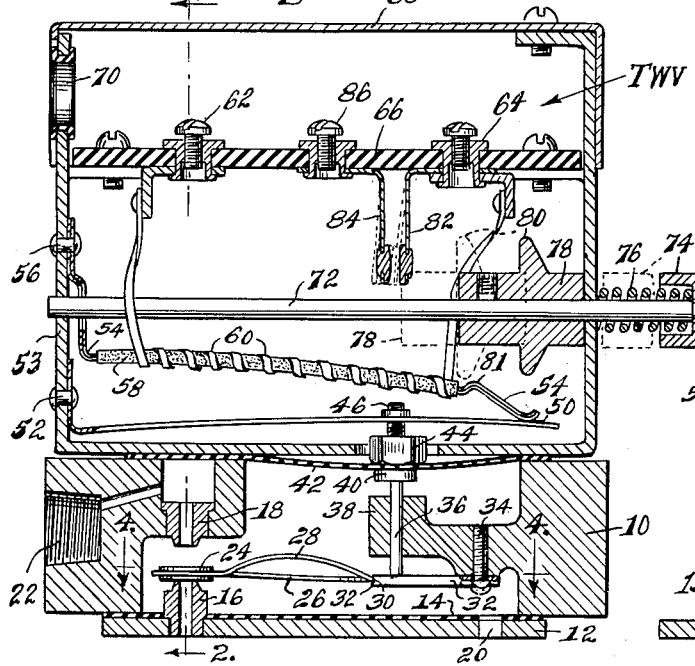
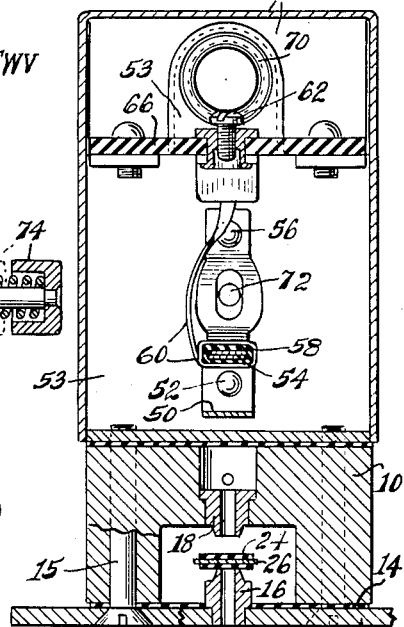
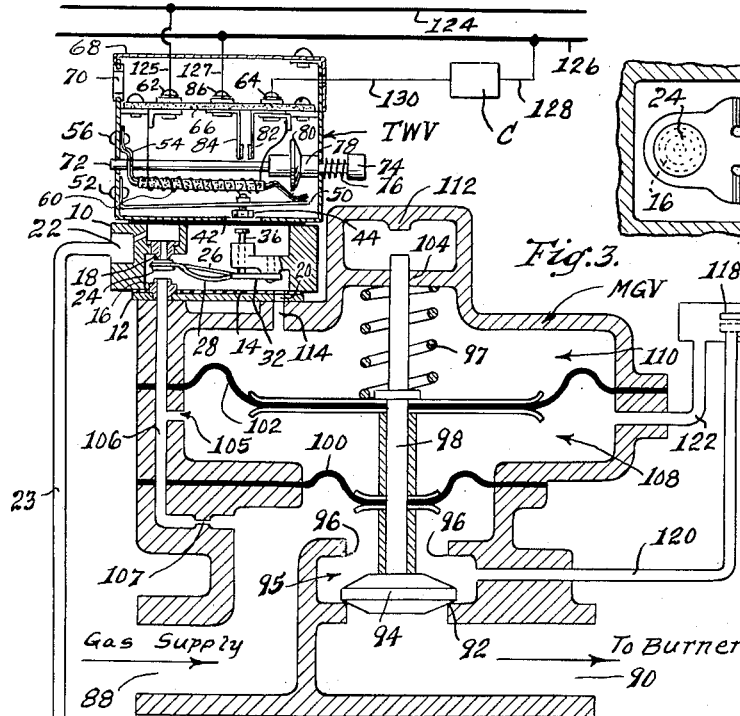
INVENTOR.
Paul Schell.
By Bair, Freeman & Molinare
Attys.

United States Patent Office 2,731,230
Patented Jan. 17, 1956

2,731,230

VALVE STRUCTURE

Paul Schell, Elkhart, Ind., assignor to Penn Controls, Inc., Goshen, Ind., a corporation of Indiana Application January 12, 1952, Serial No. 266,197

2 Claims. (Cl. 251—11)

This invention relates to a valve structure, particularly one of the three-way type adapted for pilot control of modulating gas valves or other types of control devices or instrumentalities.

One object of the invention is to provide a comparatively simple three-way valve construction which is electrically operated and which is of the snap acting type.

Another object is to provide a valve structure of this general character in which a valve element is snap actingly mounted and is actuated by a heat motor such as one of the bimetal type wherein the bimetal is warped by an electric heating element.

Still another object is to provide a valve structure of this general character wherein the valve proper is sealed relative to the actuating motor for the valve.

A further object is to provide means for manually moving the valve to the position it assumes when energized so that in case of current failure it may be set in the operative position and will automatically return to the position for automatic operation when the current is subsequently supplied to the valve.

Still a further object is to provide contacts in the valve operated by the resetting mechanism for establishing the heating element circuit of the heat motor so that when the current comes back on, the heat motor will be energized and reset the valve for automatic operations.

Still a further object is to provide a pilot three-way valve for controlling the on-off positioning of a main gas valve having both on-off and a modulating valve action.

With these and other objects in view, my invention consists in the construction, arrangement and combination of the various parts of my valve structure, whereby the objects contemplated are attained, as hereinafter more fully set forth, pointed out in my claims and illustrated in the accompanying drawings, wherein:

Figure 1 is a vertical sectional view through a valve structure embodying my present invention, the valve being shown in the position it assumes as a result of energization thereof.

Figure 2 is a sectional view on the line 2—2 of Figure 1.

Figure 3 is a diagrammatic view of the valve of Figure 1 in its opposite position and attached to a combination on-off and modulating main gas valve for controlling the on-off section thereof; and Figure 4 is a detail sectional view on the line 4—4 of Figure 1.

On the accompanying drawing I have used the reference character TWV to indicate in general my three-way valve. Numeral 10 indicates a valve body therefor open at its top and bottom. The bottom is closed in by a cover plate 12 with a gasket 14 between the valve body and the plate, the two being secured together as by screws 15 (see Figure 2).

The cover plate 12 is provided with an off seat 16 and the valve body is provided with a bleed seat 18 which communicates with a bleed outlet 22. A pressure chamber port 20 is provided in the cover plate 12 for communication with either the off seat 16 or the bleed seat 18.

For effecting such communication, a closure disc 24 is provided carried by a leaf spring 26, and snap action is imparted to the disc 24 and the spring 26 by means of a pair of toggle blades 28 of the spring coacting at their free ends with V-seats 30 in the ends of supporting blades 32. The spring 26 and the blades 32 are fixed in the valve body 10 as by means of screws 34 and the spring 26 normally is in the elevated position of Fig. 3.

An actuating pin 36 is slidable through a boss 38 of the valve body 10 and is supported by the leaf spring 26. It has a head 40 at its upper end above which is a seal-off diaphragm 42. An adjusting screw 46 has an enlarged head 44 resting on the seal-off diaphragm and is threaded into a leaf spring 50 anchored at 52 to a housing 53 that is secured to the valve body 10 above the diaphragm 42.

The leaf spring 50 is so tensioned as to be normally in the position shown in Figure 3. For depressing it to the position of Figure 1, I provide a bimetal element 54 anchored to the housing 53 as by means of a rivet 56. A layer of insulation 58 surrounds the bimetal element 54 and an electric heating element 60 is wound thereon, the ends of the element being secured to terminals 62 and 64. The terminals are mounted on a plate 66 of insulating material supported within the housing 53, the entire assembly being enclosed by a cover plate 68. One end of the housing 53 is provided with an insulation bushing 70 through which the wires to the terminals 62 and 64 may pass.

Reset means is provided for the valve structure in case of current or "power" failure consisting of a rod 72 slidably mounted in the ends of the housing 53 and carrying on its outer end a head 74 between which and the housing 53 a return spring 76 is provided. Within the housing a sleeve 78 is secured to the rod 72 and is provided with a flange 80 adapted to coact with a hump 81 on the bimetal element 54 as will hereinafter appear.

A circuit closing contact blade 82 is carried by the terminal 64 and a second contact blade 84 is connected to a terminal 86 also supported on the insulation plate 66. These contacts are normally disengaged but 82 may be manually engaged with 84 by inward movement of the rod 72 during the manual reset operation. This is shown by dotted lines in Figure 1.

A three-way pilot valve of the character herein disclosed is particularly adaptable for use in connection with a modulating gas valve of the kind shown in my copending application, Serial No. 245,743, filed September 8, 1951, now Patent No. 2,685,412, wherein the present type of three-way valve is disclosed. In Figure 3 I show diagrammatically such a modulating gas heating control valve. My three-way pilot valve is not limited to only this particular type of operation as it may be used anywhere that an electrically controlled three-way valve is necessary, with or without the manual reset feature.

Referring to Figure 3, a modulating gas valve is indicated in general by the reference character MGV, my three-way valve TWV being mounted thereon. The valve MGV has an inlet 88 from the gas supply and an outlet 90 to the burner. Within the valve an on-off valve seat 92 is provided with which a valve disc 94 is normally engaged under the action of a spring 97. Opposite the seat 92 is a modulating valve seat 96 and between these seats is an interseat chamber 95.

A valve stem 98 is connected with the valve disc 94 and seal-off diaphragms 100 and 102 are connected therewith and with the valve body as illustrated. The diaphragms provide first and second chambers 108 and 110. The upper end of the valve stem 98 extends through a valve stem guide 104 and the valve body may have means 112 to serve as a stop for the valve stem 98 in a desirable minimum-flame position of the valve disc 94 relative to the modulating seat 96.

Passageway means is provided in the body of the valve MGV at 106, and a restriction 107 therein causes 106 to constitute a restricted passageway means to the "off" seat 16 of the three-way valve TWV. The passageway 106 has a lateral port 105 to the first chamber 108 between the diaphragms 100 and 102. A passageway 114 is provided through the top of the valve body for communicating the pressure chamber port 20 of the three-way valve with the pressure chamber 110 above the diaphragm 102 in the main gas valve.

A modulating pilot valve MPV is shown diagrammatically without specific details other than a valve seat 116, a closure element 118 therefor and connections 120 and 122 to the chambers 95 and 108 in the main gas valve MGV. Full details of this particular valve are shown in my copending application above referred to. In order to explain the operation of my three-way valve TWV, I show electro-diagrammatically in Figure 3, current supply wires 124 and 126 with branch wires 125 and 127 leading to the terminals 62 and 86. A branch wire 128 leads from the wire 126 to a control device C which may be a room thermostat as shown in my copending application or any other suitable type of control device. A wire 130 leads from the control device C to the terminal 64.

*Practical operation*

In the operation of my three-way valve, in conjunction with the main gas valve MGV and the modulating pilot valve MPV, the parts are normally in the position of Figure 3, the heater 60 being de-energized. This results in the modulating gas valve MGV being closed (disc 94 against on-off seat 92) as a result of gas through the restricted passageway means 106—107, flowing through 16, 20 and 114 into the second pressure chamber 110, thus balancing the pressure in this chamber with respect to the pressure through 105 to the first pressure chamber 108. The spring 97 is therefore effective to hold the valve disc 94 closed against the on-off seat 92.

At this time the valve disc 118 of the modulating pilot valve MPV is seated against the seat 116 (dotted position in Figure 3) to cut off communication between the interseat chamber 95 and the first chamber 108 of the main gas valve.

Assuming the control device C to be a room thermostat, as the room temperature goes down the thermostat will close for energizing the heater 60. The heat generated thereby warps the bimetal blade 54 downwardly against the upward bias of the spring 50, thus driving the stem 36 downwardly and transferring the valve disc 24 from the bleed seat 18 to the off seat 16. This cuts off the flow of gas from the passageway 106 through 20 and 114 to the chamber 110 of the main gas valve and opens this chamber through 114, 20 and 18 to the bleed outlet 22 which is connected by a bleed line 23 to the burner chamber.

The gas under pressure in the pressure chamber 110 is therefore bled off to reduce this chamber to substantially atmospheric pressure so that the pressure from the inlet 88 under the diaphragm 100 and through the restricted passage means 107—106 and the lateral passageway 105 to the chamber 108 under the diaphragm 102 will result in upward movement of the valve stem 98 to open the gas valve disc 94 relative to the on-off seat and bring it adjacent but spaced from the modulating seat 96 as determined by the minimum-flame stop 112.

The modulating gas valve is now open so that gas to the burner flows through the valve and is ignited in any suitable manner at the burner. As shown in my copending application, the modulating pilot valve MPV is under control of the control device C and modulates the valve MPV as long as the control C is calling for heat. Modulation of the valve MPV is reflected in similar modulation of the modulating gas valve MGV as explained in said application and after the room thermostat is satisfied, it is desirable to again close the modulating gas valve as in Figure 3.

At this time the control device C operates to de-energize the heater 60 of the three-way valve TWV so that the heater and the bimetal element 54 cool, thereby causing the bimetal to warp upwardly again to the position shown in Figure 3 which permits the valve disc 24 under the bias of its spring 26 to likewise move upwardly and reset the valve with snap action to the position shown in Figure 3.

The manual reset mechanism is provided so that the modulating gas valve MGV can be opened under manual control by pressure inwardly on the reset knob 74. This causes the flange 80 to ride over the hump 81 of the bimetal element 54 and move the valve disc 24 to the non-normal position (seated against the off seat 16). Thereupon the gas in the chamber 110 is reduced through the bleed-off passageway 23 for permitting the pressure under the diaphragm 102 to open the valve to its modulating position against the action of the spring 97. Thereafter when current flows in the heater 60, the bimetal element 54 will warp downwardly for releasing the hump 81 from the flange 80 and the spring 76 will return the manual reset to its normal position and permit subsequent automatic operation of the three-way valve in the normal manner.

To insure the prompt return of the three-way valve to normal automatic operation, the contacts 82 and 84 are provided which are closed when the valve is reset. Accordingly, as soon as there is current in the line wires 124 and 126, the heater 60 will be energized thus releasing the reset mechanism and placing the three-way valve in position for automatic operation even though the room thermostat or control device C is open at that time.

Some changes may be made in the construction and arrangement of the parts of my valve structure without departing from the real spirit and purpose of my invention, and it is my intention to cover by my claims any modified forms of structure or use of mechanical equivalents which may be reasonably included within their scope.

I claim as my invention:

1. In a valve structure, a valve element movable to either of two positions and biased to one of said positions, means for imparting snap action to said valve element when moving to either of said positions, and means to move said valve elements to the other of said positions, means for moving said valve operating element to one of said positions comprising a bimetal element normally in one position, a heater therefor to move it to another position, an operative connection between said bimetal element and said valve element, and means for manually resetting said valve to said other of said positions comprising a movable element normally in one position and cooperable with said bimetal element when operated manually to move it to said another position, said bimetal element having a projection to retain said movable element when operated manually, said heating element upon warping said bimetal element beyond said another position removing said projection from cooperation with said movable element to permit it to return to its normal position.

2. In a valve structure, a valve element movable to either of two positions, means for imparting snap action to said valve element when moving to either of said positions, a leaf spring for moving said valve element to one of said positions, means for moving said valve element to the other of said positions comprising a bimetal element normally in one position, a heater therefor to move it to another position, an operative connection between said bimetal element and said leaf spring, said bimetal element having a projection, and means for manually resetting said valve comprising a slidable element, an enlargement thereon engageable with said projection to move said bimetal element to said another position, said projection cooperating with said enlargement to retain said slidable element, said heating element upon warping said bimetal element beyond said another position removing said projection from cooperation with said enlargement to permit said slidable element to return to its normal position.

References Cited in the file of this patent

UNITED STATES PATENTS

| | | |
|---|---|---|
| 1,311,815 | Harris | July 29, 1919 |
| 1,835,974 | Shivers | Dec. 8, 1931 |
| 2,000,542 | Wasson | May 7, 1935 |
| 2,027,190 | Miner | Jan. 7, 1936 |
| 2,030,932 | Persons | Feb. 18, 1936 |
| 2,118,443 | McCorkle | May 24, 1938 |
| 2,140,451 | Denison | Dec. 13, 1938 |
| 2,232,934 | Baak | Feb. 25, 1941 |
| 2,291,504 | Persons | July 28, 1942 |
| 2,547,098 | Smith | Apr. 3, 1951 |
| 2,608,353 | Cobb | Aug. 26, 1952 |